United States Patent [19]

Zison

[11] 4,442,901
[45] Apr. 17, 1984

[54] LANDFILL GAS RECOVERY METHOD

[75] Inventor: Stanley W. Zison, Irvine, Calif.

[73] Assignee: Getty Synthetic Fuels, Inc., Signal Hill, Calif.

[21] Appl. No.: 355,478

[22] Filed: Mar. 8, 1982

[51] Int. Cl.³ .............................................. E21B 43/22
[52] U.S. Cl. ....................................... 166/369; 166/50
[58] Field of Search ................. 166/50, 369, 370, 278; 405/128, 129

[56] References Cited

U.S. PATENT DOCUMENTS

| 3,732,697 | 5/1973 | Dickson | 405/129 |
|---|---|---|---|
| 4,026,355 | 5/1977 | Johnson et al. | 166/369 |
| 4,166,709 | 9/1979 | Valiga | 405/128 |
| 4,183,407 | 1/1980 | Knopik | 166/370 |
| 4,252,462 | 2/1981 | Klingle et al. | 405/129 |
| 4,257,650 | 3/1981 | Allen | 166/50 |
| 4,279,547 | 7/1981 | Clem | 405/270 |
| 4,344,722 | 8/1982 | Blias | 405/128 |

OTHER PUBLICATIONS

"Methane Gas Recovery from Landfills Turns This . . . Into This", by Southern California Gas, PG&E, and Argonne National Laboratory.

Primary Examiner—Stephen J. Novosad
Assistant Examiner—William P. Neuder
Attorney, Agent, or Firm—Gordon L. Peterson

[57] ABSTRACT

A method of collecting landfill gas from a landfill comprising providing a porous collector in the landfill having a relatively broad collection zone in the path of migrating landfill gas, controlling the pressure in the collector to induce the landfill gas near the collector to flow into the collector, removing the landfill gas from the collector, and substantially excluding air from the atmosphere from entering the collector when the collector is collecting landfill gas.

31 Claims, 4 Drawing Figures

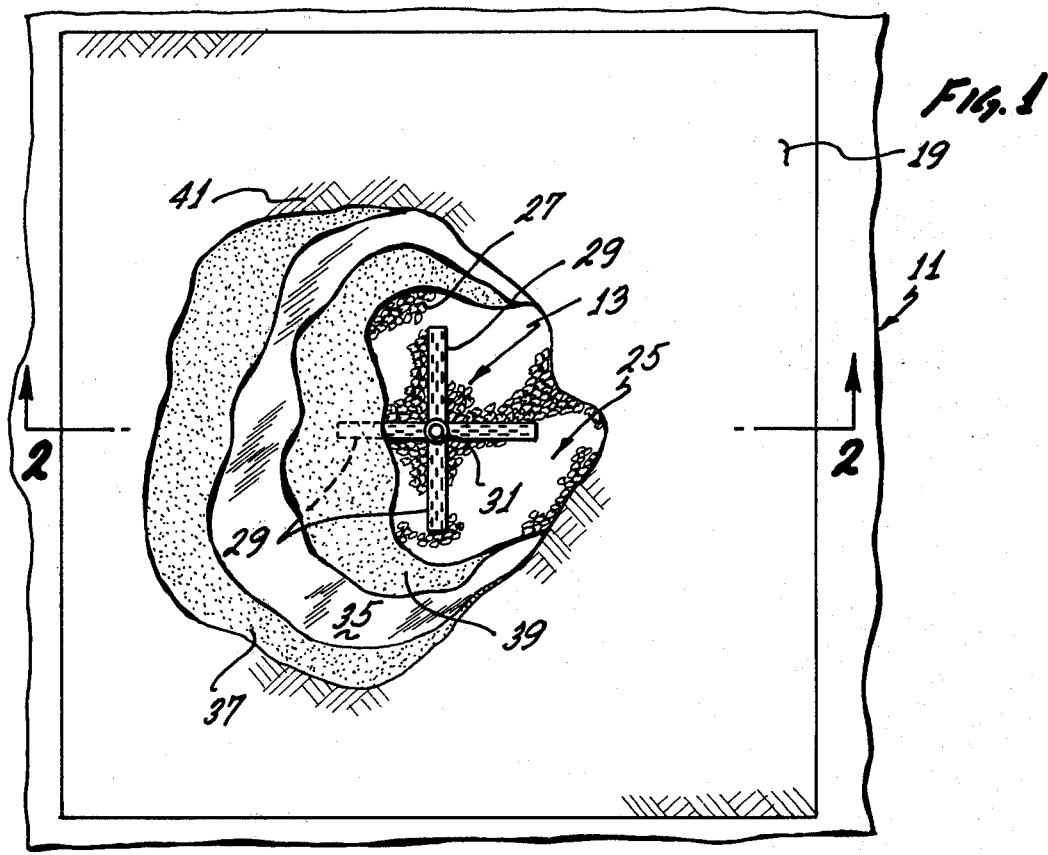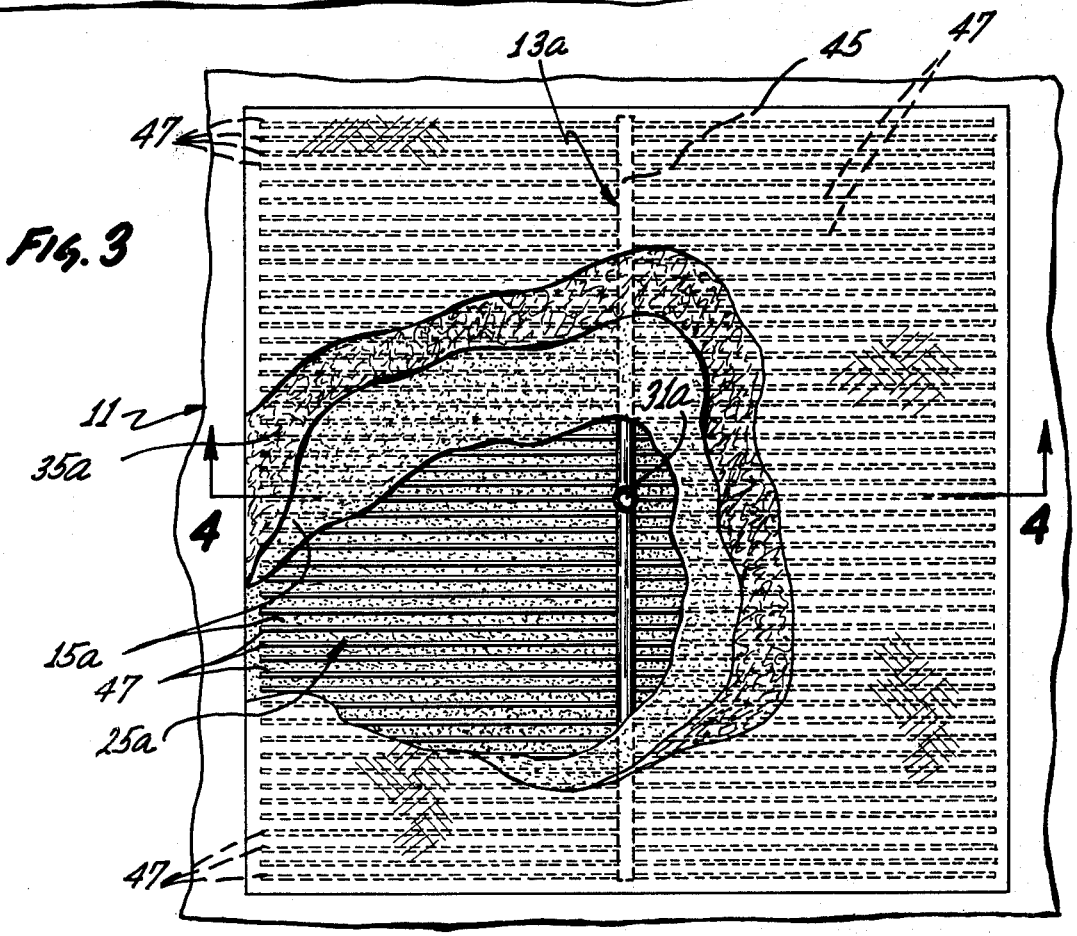

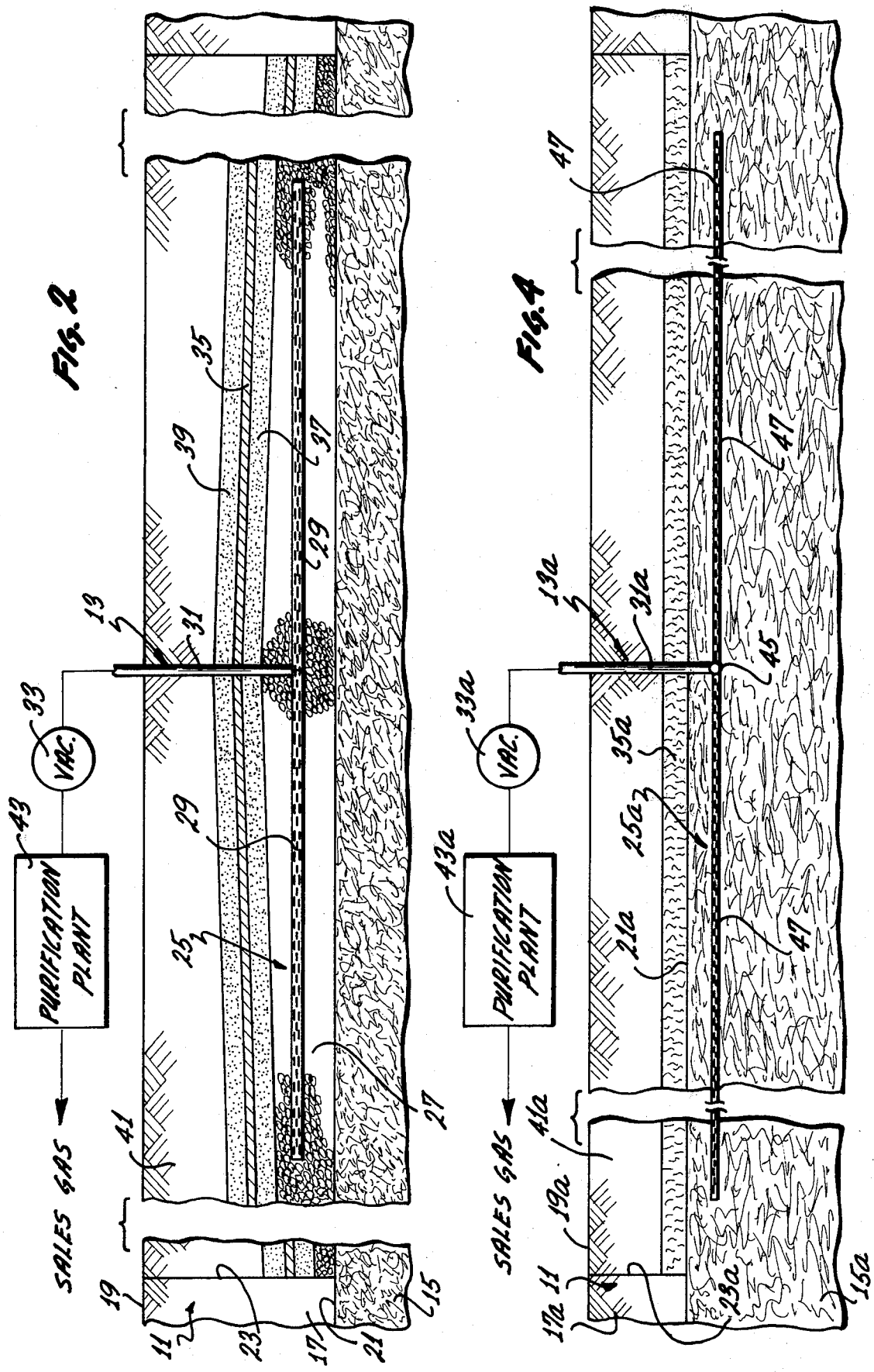

LANDFILL GAS RECOVERY METHOD

BACKGROUND OF THE INVENTION

The decomposition of refuse in a landfill produces landfill gas which may include, for example, about fifty (50%) percent methane. Landfill gas within the landfill is at some positive pressure, i.e., pressure above ambient, and accordingly, the landfill gas tends to migrate vertically toward the surface of the landfill due to the differential pressure between the interior of the landfill and the atmosphere. Initially, landfill gas escaping from the surface of a landfill was considered hazardous because of its methane content. However, more recently, landfill gas has been recovered and its nonmethane components removed to varying degrees to permit it to be used as an energy source.

The common technique for recovering landfill gas for ultimate utilization is to drill a vertical well, the depth of which may be, for example, from thirty (30) feet to about 250 feet. The well is lined with a perforated casing so that landfill gas can enter the well through the perforations. To induce landfill gas to flow into the well, the well is maintained at below local landfill pressure.

When landfill gas is to be recovered for ultimate utilization, it is important to exclude oxygen from the landfill because oxygen is detrimental to the production of methane by the landfill. Accordingly, it is important that the pressure within the well not be allowed to get so low that ambient air is drawn into the landfill through the surface of the landfill. This limitation on the negative pressure within the well limits the zone of influence which each vertical well has, and this is discussed, for example, in Johnson et al U.S. Pat. No. 4,026,355.

The traditional vertical well has a number of significant disadvantages. For example, if breakthrough, i.e., the drawing of oxygen into the landfill, occurs, there may be a significant time lag between the occurrence of breakthrough and its discovery. Also, when breakthrough occurs, it may be difficult to find the source of the breakthrough at the surface. Boring of vertical wells can be difficult particularly under wet conditions, and the depth of vertical wells is a significant hazard. Leachate tends to collect in the bottom of vertical wells and must be pumped out, and access to the lower regions of the vertical well is difficult to obtain. Finally, the lateral movement or shearing of adjacent planes in the landfill can cause the well to fail in shear.

SUMMARY OF THE INVENTION

This invention is based, in part, upon the recognition that the gas generation rate is substantially equal to the venting rate. In other words, almost all of the landfill gas that is generated must vent to the atmosphere through the upper surface of the landfill. This is the result of the differential pressure between the interior of the landfill and ambient air pressure.

This invention takes advantage of this fact and provides for collection of the landfill gas in broad, shallow wells. Because substantially all of the landfill gas that is generated finds its way to the surface on its own, this invention eliminates the deep vertical well of the prior art and its accompanying problems and provides for landfill gas collection near the surface of the landfill.

With this invention, a porous collector is provided in the landfill in the path of landfill gas migrating to the surface. The interior of the collector is placed at a pressure that will induce the landfill gas in the vicinity of the collector to flow into the collector. The collected landfill gas is then removed from the collector.

The collector preferably has a relatively broad collection zone which may be panel-like. This provides the collection zone with two substantial dimensions, i.e., a broad collection surface or area whereas the single vertical well provides essentially a collection line. The broad collection zone is preferably oriented generally transverse to the path of migrating landfill gas, whereas the collection line of the single vertical well is oriented vertically.

The porous collector may be of various different constructions and may include, for example, aggregate such as gravel. Alternatively or in addition thereto, the collector may include one or more apertured conduits. In one preferred construction, a network of apertured conduits is utilized for landfill gas collection purposes.

Oxygen may be substantially excluded from the collector and landfill in different ways. For example, to collect the landfill gas migrating to the surface along a path lying directly beneath the collector, the collector is placed at least at atmospheric pressure when the landfill gas enters it. In this event, landfill gas in this path is induced to enter the collector, and there is no differential pressure between the landfill surface and the collector that would tend to cause breakthrough.

To increase the horizontal dimensions of the region from which landfill gas is drawn into the collector, a gas barrier may be installed above the collector. This permits the pressure within the collector to be at less than atmospheric thereby tending to induce flow of landfill gas into the collector from regions radially outward from the collector. The gas barrier may be coextensive with, or extend radially outwardly beyond, the collector.

Although the collector can be located at different depths within the landfill, it is preferably near the upper surface of the refuse in the landfill. By positioning the collector near the upper surface of the refuse in the landfill, excavation is minimized, access to the collector is facilitated and the region in which breakthrough may occur is minimized. If breakthrough occurs, oxygen will be introduced only into the upper region of the landfill. Additionally, a maximum amount of water vapor can condense out of the landfill gas and be retained by the landfill before it enters the collector. Because the collector is located at a shallow location, if breakthrough occurs, the time lag between when it occurs and when it is observed is significantly less than for a deep well. Also, water can drain from a shallow well into the landfill, and there is no shearing problem with a shallow well.

The gas barrier may comprise one or more layers of any suitable material which is substantially impervious to landfill gas and oxygen. For example, the gas barrier may include a thin plastic sheet and/or a polymerized clay, such as polymerized bentonite. Regardless of the type of gas barrier used, as the generation rate of the well declines, its surface area can be extended to provide additional gas inflow rather than adding additional wells. Also, it is not necessary that the gas barrier be totally impervious to gas flow because the area of the gas barrier will be quite large and so cracks or perforations in the barrier will typically represent only a very small percent of the total surface area of the barrier.

The landfill gas generation rate is not uniform throughout the landfill. Moreover, because the landfill is not homogeneous, the flow of landfill gas to the surface is also not homogeneous. Accordingly, one problem with landfill gas recovery is determining where to put the wells. For deep vertical wells, it is sometimes necessary to extensively sample the landfill at various depths in an effort to determine the best locations for the deep wells.

With this invention, landfill surveying is made easier, and wells can be positioned at more desirable locations. Because the landfill gas is collected near the landfill surface, the landfill is surveyed to determine the gas venting rates for a number of regions at or adjacent the upper surface of the landfill. The collector is then located at or near the region having approximately the desired gas venting rate.

This invention, together with additional features and advantages thereof, may best be understood by reference to the following description taken in connection with the accompanying illustrative drawing.

BRIEF DESCRIPTION OF THE DRAWING

FIG. 1 is a plan view, with portions broken away, of a landfill having a shallow well constructed in accordance with the teachings of this invention in the landfill.

FIG. 2 is a sectional view taken generally along line 2—2 of FIG. 1.

FIG. 3 is a plan view, with portions broken away, of a portion of a landfill having a second form of shallow well constructed in the landfill.

FIG. 4 is a sectional view taken generally along line 4—4 of FIG. 3.

DESCRIPTION OF THE PREFERRED EMBODIMENTS

FIGS. 1 and 2 show a portion of a landfill 11 having a shallow well 13 therein. The landfill 11 includes refuse 15 which may, for example, be over 200 feet deep and a layer of cover material 17 above the refuse. The refuse 15 decomposes and produces a landfill gas which is under some small positive pressure greater than ambient. Consequently, the landfill gas migrates upwardly toward the upper surface 19 of the landfill. The shallow well 13 is located in the path of some of the landfill gas which is migrating upwardly toward the upper surface 19.

Although the shallow well 13 could be located virtually anywhere in the landfill, it is generally preferred to locate the well 13 for maximum production of landfill gas. To accomplish this, the landfill 11 is surveyed to determine the gas venting rate at various regions of the landfill. Because the well 13 is shallow, the gas venting rate may be determined for various regions on the upper surface 19 or at shallow regions beneath the upper surface 19, such as at the upper surface 21 of the refuse 15. Determining the venting rate at the surface 19 has the advantage of not having to excavate to perform the tests and it provides venting rate information very close to where actual collection of the gas will occur.

The gas venting rate can be determined in accordance with various known techniques. For example, landfill gas has an odor and so relative gas venting rates can be determined by smelling with the more odiferous regions being regions where the gas venting rate is higher.

Another way to determine the gas venting rate is to use a methanometer. For this purpose, a flux box having an open bottom is placed on the surface at which it is desired to determine the gas venting rate, and the landfill gas is allowed to flow into the flux box. The methanometer then provides a read-out indicative of the landfill gas venting rate.

After the survey of gas venting rates has been completed, the shallow wells 13 are located at the regions having the desired landfill gas venting rates. Typically the regions selected for one of the wells 13 will have an above-average landfill gas venting rate for those regions surveyed, and wells may be located at the regions having the maximum gas venting rates.

After the site for the shallow well 13 has been selected, the cover material 17 is excavated from the selected region of the landfill 11 to form a hole 23. In the embodiment of FIGS. 1 and 2, the hole 23 extends to approximately the upper surface 21 of the refuse 15. Although the hole 23 may cover any desired area of the landfill as viewed in plan, preferably it covers a broad panel-like region so that it has a relatively broad area in the path of landfill gas migrating toward the upper surface 19. For example, the hole 23 may be 150 feet × 150 feet as viewed in plan.

The depth of the hole 23 is preferably to approximately the upper surface 21 of the refuse 15. Although the hole 23 could be deeper and penetrate the refuse 15 to varying degrees, there appears to be no significant advantage to this and so it is generally preferred to have the bottom of the hole be closely adjacent the upper surface 21 of the refuse 15 in the embodiment of FIGS. 1 and 2. As a rule of thumb, which is not critical, it generally is unnecessary to make the hole 23 any more than 12 to 15 feet deep.

Next, a porous collector 25 is installed in the hole 23. In this embodiment, the collector 25 includes aggregate 27 and a network of apertured conduits comprising four apertured conduits 29 which, for example, may be arranged perpendicular to each other to form a cross as shown in FIG. 1. The particles of the aggregate 27 must be of sufficient size to permit adjacent aggregate particles to form passages so that the body of aggregate forms a porous mass. For example, the aggregate 27 may be gravel, broken concrete or the like.

As viewed in plan, the aggregate 27 preferably covers the entire length and width dimensions of the hole 23. Accordingly, the passages formed by the aggregate 27 can receive landfill gas from at least the area immediately therebelow. Thus, the aggregate 27 provides a broad panel-like collection zone facing downwardly and extending transverse to the path of the migrating landfill gas. The broad collection zone has a large number of apertures spread throughout to receive the migrating landfill gas. To maximize collection, the broad dimensions of the collection zone are generally parallel to the preexcavation upper surface 19 which may be horizontal or inclined.

The conduits 29 are centrally located in the hole 23 and in the aggregate 27. As described more fully hereinbelow, the interiors of the conduits 29 are preferably maintained at a pressure less than the pressure of the landfill gas in the refuse adjacent the aggregate 27. Accordingly, the landfill gas is induced to flow into the aggregate 27 and toward the conduits 29. This means that more landfill gas exists centrally in the collector 25 than around its periphery. Accordingly, in the form shown in FIG. 1, the aggregate has a greater thickness centrally of the collector 25 than at the periphery of the collector. In the specific embodiment shown in FIGS. 1 and 2, the thickness of the aggregate 27 progressively increases from the periphery toward the center of the collector 25.

Any number of the conduits 29 may be employed, and the four conduits illustrated are purely illustrative. The conduits 29 may be substantially shorter than the length and width dimensions of the aggregate 27. By way of example and not by way of limitation, each of the conduits 29 may be twenty feet in length when used in a 150 foot square hole 23. Although it is not critical, the conduits 29 in the embodiment illustrated are of equal length, extend horizontally and parallel to the upper surface 21, and are spaced upwardly from the upper surface 21 of the refuse 15. The conduits 29 have their outer ends capped and may be constructed of any suitable metal or plastic; however, polyethylene is preferred. The size, arrangement and configuration of the apertures in each of the conduits 29 may be varied, however, a large open area is preferred.

The conduit 29 is coupled to a landfill gas recovery conduit 31 which is coupled to the inner ends of the conduits 29. The conduit 31 may extend to a location above the upper surface 19. The end of the conduit 31 remote from the conduits 29 is connected to a suitable vacuum source, such as a vacuum pump 33 so that the pressure within the conduits 29 and 31 can be controlled and preferably maintained slightly negative, such as, for example, two inches of water less than current ambient pressure.

In installing the collector 25, a first portion of the aggregate 27 can be placed in the hole 23. Thereafter, the conduits 29 and 31 can be installed with the conduits 29 resting on top of this first layer of aggregate. Thereafter, the remainder of the aggregate 27 can be filled into the hole 23 to completely cover the conduits 29.

To increase landfill gas production from the well 13 without drawing air from the atmosphere into the landfill, a gas barrier 35 can be employed. In this embodiment, the gas barrier 35 is in the form of an imperforate polyethylene sheet which is above the collector 25. The gas barrier 35 covers at least the region immediately above the collector. If desired, the gas barrier 35 may extend laterally beyond the periphery of the collector. The conduit 31 extends upwardly through the gas barrier 35, and the gas barrier is otherwise imperforate. To protect the gas barrier 35 from being punctured by any sharp components either above or below the barrier 35, the barrier is preferably sandwiched between protective layers, such as sand 37 and 39 which are coextensive with the gas barrier.

Finally, the hole 23 is filled with soil 41. If desired, additional soil may be piled on top to increase the thickness of the cover layer beyond the thickness of the cover layer elsewhere in the landfill 11.

In operation, the vacuum pump 33 is operated and controlled to control the pressure in the collector 25 so that substantial quantities of the landfill gas immediately beneath the collector and in a peripheral zone outside the area of the collector are induced to enter the collector and flow through the collector and the landfill gas recovery conduit 31. If desired, the landfill gas may then be conducted through a purification plant where the desired quantities of impurities, i.e., non-methane components of the landfill gas, are removed. The output from the purification plant 43 constitutes sales gas which can be sold as useful fuel.

The gas barrier 35 prevents any of the landfill gas entering the collector 25 from escaping directly upwardly to the upper surface 19. In addition, the gas barrier 35 prevents oxygen from the air immediately above the collector 25 from being drawn into the collector or the landfill 11. The gas barrier 35 also permits a somewhat higher vacuum to be applied to the collector 25 so that landfill gas from a region of the landfill surrounding the collector 25 is induced to flow into the collector, and this increases the production of the well 13.

To illustrate the shallow nature of the well 13, the depth of the collector 25 in a central region may be, for example, three feet. The layers 37 and 39 and the gas barrier 35 may each be about one foot thick, and there may be three feet of the soil 41 at the central region of the well. Thus, in this example, the depth of the well is only seven feet. Of course, the well 13 can be at any desired depth, and the dimensions given herein are purely illustrative.

FIGS. 3 and 4 show a shallow well 13a in the landfill 11 which is identical to the shallow well 13 of FIGS. 1 and 2 in all respects not shown or described herein. Portions of the well 13a corresponding to portions of the well 13 are designated by corresponding reference numerals followed by the letter "a."

The primary differences between the wells 13 and 13a are in the construction of the collectors and the gas barriers. The well 13a is the presently preferred embodiment of the invention because it is less costly to construct.

The well 13a has a collector 25a which does not include aggregate. Rather, the collector 25a includes a network of apertured conduits which is much more extensive than the conduits 29 of FIGS. 1 and 2. With the collector 25a, the apertured conduits extend to substantially all areas of the hole 23a so that a broad panel-like collection zone is provided by the conduits and such zone is generally transverse to the path of the landfill gas migrating to the upper surface 19a.

There are a large number of configurations which the network of apertured conduits can assume. For example, the network of apertured conduits may include a collection header 45 having its ends capped and a series of parallel laterals 47 extending perpendicular to the header and having their outer ends capped. The header 45 and the laterals 47 may each be a polyethylene pipe, and the header is of much larger diameter than the laterals. The header 45 may be substantially imperforate, whereas each of the laterals 47 is apertured and may have a relatively high percent of open area to provide a large number of apertures spread over a broad zone which is transverse to the direction of the migrating landfill gas. The laterals 47 should be close enough together so that they can collect substantially all of the landfill gas that flows upwardly from the landfill immediately therebelow. For example, the laterals 47 may have a three foot center-to-center spacing. Although different orientations are possible, in the embodiment illustrated, the header 45 and the laterals 47 extend generally parallel to the surface 19.

Another difference between the illustrated exbodiments of this invention is that the collector 25a is preferably located slightly below the upper surface 21a of the refuse 15a. For example, the header 45 and the laterals 47 may be a few inches to a few feet below the upper surface 21a. Of course, the collector 25a could be placed at other depths in the landfill if desired.

Another difference between the illustrated embodiments of this invention is that the gas barrier 35a is in the form of a layer of polymerized clay, such polymerized bentonite. Polymerized bentonite is available, for example, from Dowell (a division of Dow Chemical) of Denver, Colorado, as Dowell M179 and is a known gas barrier.

The gas barrier 35a may be of any desired thickness and, in the embodiment illustrated, lies on the surface 21a of the refuse 15a with the refuse between the collector 25a and the barrier 35a protecting the header 45 and the laterals 47. In this embodiment, the gas barrier 35a extends laterally beyond the ends of the laterals 47 as shown in FIG. 4, but this is not necessary.

The layer of soil 41a may be substantially uniform in thickness. The landfill gas recovery conduit 31a is coupled to the header 45 and projects upwardly through the gas barrier 35a and the soil 41a.

In constructing the well 13a, the cover material 17a is removed and either the entire top layer of the refuse 15a is removed or trenches are dug in the refuse in a pattern appropriate to receive the header 45 and the laterals 47. The collector 25a and the conduit 31a are then installed, and the collector is buried in refuse. Thereafter, the gas barrier 35a is constructed following the directions of the manufacturer of the polymerized bentonite. For example, the bentonite with additives, which can be purchased in powdered form, is disked into the soil above the refuse 15a and then the resulting mixture is drenched with water to bring about the polymerization. The collector 25a and the conduit 31a are subjected to pressures less than atmospheric during the curing of the barrier 35a to prevent landfill gas from flowing through the barrier as it is curing. If landfill gas were allowed to flow through gas barrier 35a, the gas barrier would be porous as a result of the passages established by the landfill gas. Lastly, the soil 41a is placed into the hole 23a.

The well 13a is also shallow. For example, the collector 25a may be under one foot of refuse. The gas barrier 35a may be one foot thick, and the soil layer 41a may be three feet thick. Of course, these dimensions, as well as other dimensions set forth herein, are purely illustrative and should not be regarded as limiting the invention in any way. The well 13a can be operated in the same manner as described above for the well 13 to recover landfill gas directly for use or for purification by a purification plant 43a to produce sales gas.

Although exemplary embodiments of the invention have been shown and described, many changes, modifications and substitutions may be made by one having ordinary skill in the art without necessarily departing from the spirit and scope of this invention.

I claim:

1. A method of collecting landfill gas from a landfill wherein the landfill gas is produced by refuse in the landfill and migrates upwardly toward the upper surface of the landfill, said method comprising:
providing a porous collector near the upper surface of the landfill with the collector including a network of apertured conduits and having a relatively broad collection zone in and generally transverse to the path of the migrating landfill gas;
placing the collector at a pressure so that at least substantial quantities of the landfill gas in said path are induced to flow into the collector;
removing the landfill gas from the collector; and
substantially preventing air from the atmosphere from being drawn into the landfill gas-producing refuse when the collector is collecting landfill gas.

2. A method as defined in claim 1 wherein said collection zone faces generally downwardly.

3. A method as defined in claim 1 wherein said step of providing includes providing said collector within twelve feet of the top of the refuse in the landfill.

4. A method as defined in claim 1 wherein said step of providing the porous collector includes providing aggregate in the path of the migrating landfill gas with the aggregate defining flow passages between adjacent aggregate particles.

5. A method as defined in claim 1 including conducting at least the combustible portion of the landfill gas to a location for marketing such portion as useful fuel.

6. A method as defined in claim 1 wherein said step of placing includes controlling the pressure in the collector to at least assist in avoiding drawing oxygen from the atmosphere into the landfill gas-producing refuse when the collector is collecting landfill gas.

7. A method as defined in claim 1 wherein said step of preventing includes providing a gas barrier above the collection zone.

8. A method as defined in claim 7 wherein said step of providing a gas barrier includes providing a broad sheet of plastic above the collection zone.

9. A method as defined in claim 7 wherein said step of providing a gas barrier includes providing a layer of polymerized clay above the collection zone.

10. A method as defined in claim 7 wherein the gas barrier extends laterally beyond the periphery of the collector.

11. A method as defined in claim 1 wherein said step of providing includes providing said collector near the upper surface of the refuse in the landfill and said step of preventing includes controlling the pressure in the collector to at least assist in avoiding drawing oxygen from the atmosphere into the landfill gas-producing refuse when the collector is collecting landfill gas and providing a gas barrier above the collection zone.

12. A method of collecting landfill gas from a landfill wherein the landfill gas is produced by decomposition of refuse in the landfill and migrates upwardly toward the upper surface of the landfill, said method comprising:
surveying the landfill to establish gas venting rates for a plurality of regions adjacent the upper surface of the landfill;
providing a porous landfill gas collector in the landfill near the upper surface of the refuse in the landfill and near one of said regions having approximately the desired gas venting rate;
placing the collector at a pressure to induce landfill gas adjacent the collector to enter the collector;
removing the landfill gas from the collector; and
substantially preventing oxygen from the atmosphere from entering the refuse which is producing landfill gas when the collector is collecting landfill gas.

13. A method as defined in claim 12 wherein at least some of said regions are on the upper surface of the landfill.

14. A method as defined in claim 12 wherein said one region has a gas venting rate which is above average for those regions surveyed and said collector is at said one region.

15. A method as defined in claim 12 wherein said collector is within twelve feet of the top of the refuse in the landfill.

16. A method as defined in claim 12 wherein said collector includes a network of apertured conduits defining a broad collection zone which is oriented generally transverse to the path of migrating landfill gas.

17. A method as defined in claim 12 wherein said step of preventing includes controlling the pressure in the collector to at least assist in avoiding drawing oxygen from the atmosphere into the collector when the collector is collecting landfill gas.

18. A method as defined in claim 12 wherein said step of preventing includes providing a gas barrier above the collection zone.

19. A method of making a landfill gas recovery well in a landfill wherein the landfill gas is produced by decomposition of refuse in the landfill and migrates upwardly toward the upper surface of the landfill, said method comprising:
surveying the landfill to establish gas venting rates for a plurality of regions adjacent the upper surface of the landfill;
providing a broad, shallow hole near one of said regions with the hole extending downwardly at least to the upper surface of the refuse in the landfill;
installing a porous landfill gas collector near the upper surface of the refuse in the hole adjacent the bottom of the hole with the collector having a relatively broad collection zone generally transverse to the migrating landfill gas for collecting at least some of such landfill gas;
installing a gas barrier in the hole above the collector;
at least partially filling the hole to cover the gas barrier; and
providing a landfill gas recovery conduit which extends from the collector whereby landfill gas entering the collector can be recovered.

20. A method as defined in claim 19 wherein said step of providing includes excavating a region of the landfill to provide said hole.

21. A method as defined in claim 19 wherein said step of installing the collector includes installing a network of apertured conduits.

22. A method as defined in claim 21 wherein said conduits are in the refuse and extend more horizontally than vertically.

23. A method as defined in claim 19 wherein said step of installing a gas barrier includes installing a layer of polymerized clay above the collector with a layer of refuse being between the barrier and the collector.

24. A method as defined in claim 23 wherein said step of installing the collector includes installing a network of apertured conduits which extend generally laterally within the hole.

25. A method as defined in claim 19 wherein said step of installing the collector includes partially filling said hole with aggregate with the aggregate being in contact with the refuse.

26. A method as defined in claim 19 wherein said step of installing the barrier includes providing a flexible sheet which is substantially impervious to landfill gas and a protective layer adjacent the sheet to protect the flexible sheet against perforation.

27. A method as defined in claim 19 including providing the collector with increased landfill gas carrying capacity adjacent the landfill gas recovery conduit.

28. A method of collecting landfill gas from a landfill wherein the landfill gas is produced by decomposition of refuse in the landfill and migrates upwardly toward the upper surface of the refuse, said method comprising:
surveying the landfill to establish gas venting rates for a plurality of regions adjacent the upper surface of the landfill;
installing a porous landfill gas collector near the upper surface of the refuse in the landfill and near one of said regions with the collector being in the path of the migrating landfill gas and having a relatively broad collection zone generally transverse to the migrating landfill gas;
installing a gas barrier above the collector;
placing the collector at a pressure to induce at least some of the landfill gas in said path to flow into said collector; and
removing the landfill gas from the collector.

29. A method as defined in claim 28 wherein said step of placing includes controlling the pressure in the collector to at least assist in avoiding drawing oxygen from the atmosphere into the collector when the collector is collecting landfill gas.

30. A method as defined in claim 1 wherein the landfill has an upper preexcavation surface and the broad dimensions of the collection zone are generally parallel to said upper preexcavation surface of the landfill.

31. A method as defined in claim 1 wherein said collector provides a large number of apertures spread over the broad collection zone.

* * * * *

UNITED STATES PATENT OFFICE
CERTIFICATE OF CORRECTION

Patent No. 4,442,901                    Dated Apr. 17, 1984

Inventor(s)  Stanley W. Zison

It is certified that error appears in the above-identified patent and that said Letters Patent are hereby corrected as shown below:

Column 8, lines 31-33, after "wherein" delete -- said step of providing includes providing said collector near the upper surface of the refuse in the landfill and --

Signed and Sealed this

Twenty-eighth Day of August 1984

[SEAL]

*Attest:*

*Attesting Officer*

GERALD J. MOSSINGHOFF

*Commissioner of Patents and Trademarks*